Sept. 11, 1962  J. L. WILLIAMS  3,052,963
FABRICATED BONNET VALVE AND METHOD OF MAKING THE SAME
Original Filed March 17, 1955

INVENTOR.
JOHN L. WILLIAMS
BY
Buckhorn and Cheatham
ATTORNEYS

United States Patent Office 3,052,963
Patented Sept. 11, 1962

3,052,963
FABRICATED BONNET VALVE AND METHOD
OF MAKING THE SAME
John L. Williams, 17467 NE. West View Road,
Oswego, Oreg.
Continuation of application Ser. No. 494,830, Mar. 17,
1955. This application Mar. 26, 1959, Ser. No.
802,224
1 Claim. (Cl. 29—157.1)

This invention relates to fabricated bonnet valves and to methods of making the same. The present invention will be described in connection with a bonnet gate valve, particularly a wedge gate type bonnet valve. This application is a continuation of my prior application filed March 17, 1955, Serial No. 494,830 and now abandoned and entitled "Fabricated Bonnet Valve and Method of Making the Same."

Heretofore, the valve bodies and bonnets of bonnet type valves have either been cast or fabricated from plate and strip stock. In larger size bonnet type gate valves, the fabricated construction, such as disclosed in the Rovang Patent 2,683,581 is much less expensive than the cast construction. Still, the cost of fabricating bonnet type gate valves remains high and there has been constant effort to find a way of substantially reducing the cost of constructing such valves.

It is a main object of the present invention to provide a bonnet valve having a new and improved fabricated body and bonnet which are simple and inexpensive in construction.

Another object of the present invention is to provide a simple and inexpensive method of fabricating the body and bonnet of a bonnet valve.

A further object of the present invention is to provide a method of forming a valve body for a bonnet type valve wherein the body includes a deep gate chest portion that is formed by simple shallow drawing and welding operations.

A still further object of the present invention is to provide a method of fabricating the valve body and bonnet of a bonnet valve such that such parts have curved walls to be better suited for high pressure work, the method being such that both the gate chest and bonnet of the valve body may be formed by the use of a single punch and die.

The valve of the present invention is characterized by having a gate chest and bonnet composed of a pair of boat-shaped complementary halves welded together in matching relation, the body being separable along a plane transverse to the length of the body so as to provide a bonnet and a gate chest.

The method of the present invention is characterized by including the steps of forming two identical boat-shaped complementary halves, welding the halves together in matching relation to form an elongated hollow body, and then severing an end portion from the hollow body so that the end portion defines a bonnet for the valve and the remainder of the hollow body defines a gate chest for the valve.

Various other objects of the present invention will be apparent from the following description taken in connection with the accompanying drawings, wherein.

Figure 1:
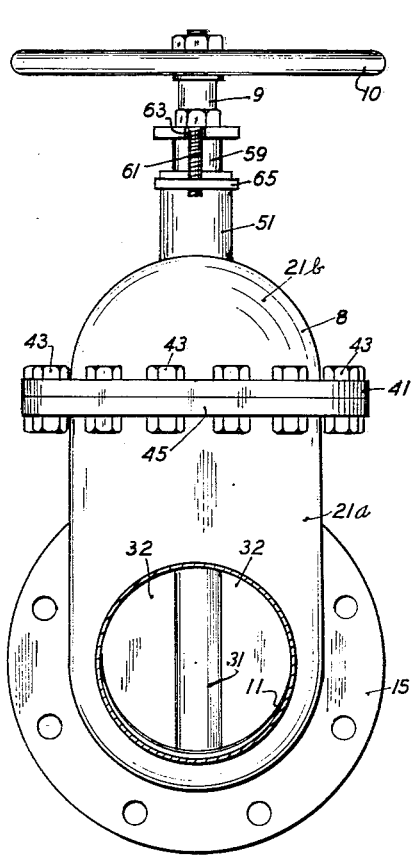
FIG. 1 is an end elevational view of the valve embodying the concepts of the present invention, the view being taken just inside the rear bolting flange and along the line 1—1 of FIG. 2.

Referring to the accompanying drawings, the wedge gate type bonnet valve disclosed includes a valve body 6, a wedge gage 7, a bonnet 8, a valve stem 9 for raising and lowering the gate, and a handwheel 10 secured to the upper end of the valve stem.

More in detail, the valve body has a flow passage defined in part by a pair of aligned cylinders 11 and 13 having bolting flanges 15 welded to the outer ends thereof. The inner ends of the cylinders project into and are welded to a deep curved wall gate chest formed of two complementary halves 21a and 23a, welded together by a continuous weld 25a. The inner ends of the cylinders 11 and 13 are obliquely formed relative to the axes of the cylinders and such inner ends carry valve seats 27 arranged to cooperatively receive the wedge gate 7 which is of conventional construction.

The valve disclosed in the drawings is of the non-rising stem type and thus the wedge gate includes an internally threaded tube 31 threadedly receiving the lower end of the valve stem 9. Transverse walls 32 (FIG. 1) span the area between the tube 31 and the encircling band 33 in a conventional manner. A pair of gate guides, not shown, are provided on the interior of the gate chest to guide the wedge gate during movement thereof and to prevent rotation of the wedge gate. These gate guides are similar to those shown in the Rovang patent above referred to.

Closing the upper end of the valve chest is the bonnet 8 which comprises a pair of complementary halves 21b and 23b welded together by welds 25b. The bonnet has a bolting flange 41 welded thereto and held by bolts and nuts 43 against a clamping flange 45 welded around the upper end of the gate chest.

The upper unthreaded end of the valve stem 9 rotatably extends through a packing box 51 which has a reduced lower end fitting within an opening 53 formed in the top surface of bonnet 8. The packing box is welded to the bonnet. Arranged within the packing box is a collar 54 which is fixed to the valve stem, such as by a screw or pin, to prevent axial movement of the valve stem. Fixed within the packing box is packing box insert 55 which receives packing 57. A packing gland 59 fits within the insert and against the packing and may be forced downwardly by a pair of bolts 61 which fit within notches 63 formed in a flange on the gland. The bolts threadedly extend through holes in a flange 65 provided on the packing box 51.

When the handwheel 10 is rotated in the proper direction, the valve stem 9 will thread into the gate 7 to draw the gate upwardly and thus open the valve.

Figure 2:
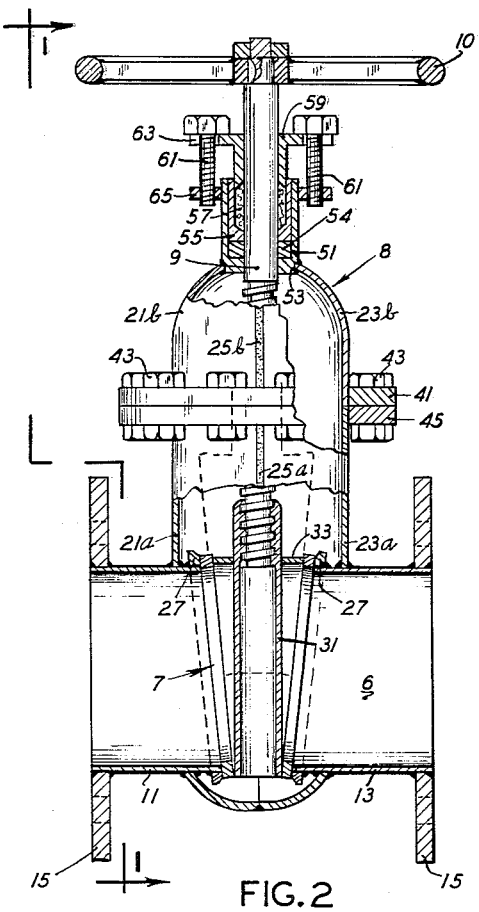
FIG. 2 is a view in side elevation, with parts broken back to a central, vertical longitudinal plane to more clearly show the construction of the valve.

In fabricating the gate chest and bonnet of the valve disclosed in FIGS. 1 and 2, a pair of identical boat-shaped complementary halves or complementary half shells 21 and 23 are formed from identical, generally ellipitical blanks. As is apparent from the drawings, each half shell has end portions which are continuously convexly curved throughout. In fact, the end portions are of identical shape and thus each half shell is symmetrical about a transverse medial plane. Each of the boat-shaped halves has a depth considerably less and only a fraction of the length thereof, and a width which is greater than its depth, so that each of such halves may be formed in a simple drawing press. Preferably, the halves are formed in either a single action drawing press having a special blank holder provided therefor, or in a conventional double-action press equipped with a conventional blank holder.

Figure 3:
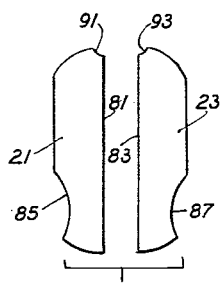
FIGS. 3, 4 and 5 show various steps in the fabrication of the gate chest and bonnet of the valve disclosed in FIGS. 1 and 2.
Figure 4:
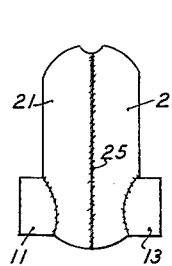

After the boat-shaped halves are formed the edges thereof are trimmed, if trimming is necessary, and then the edges are ground, such as on a flat sanding belt, to provide matching edges 81 and 83 (FIG. 3). Openings 85 and 87 may be formed in the back walls of the halves 21 and 23 at the time of drawing the blanks, by providing the drawing press with a punch and die for cutting out a suitable portion of each half. Alternatively, the openings 85 and 87 may be formed after the boat-shaped halves 21 and 23 have been formed.

A semicircular notch 91 is formed in the upper end of half 21 and a similar complementary notch 93 is formed in the upper end of half 23, as the parts are depicted in FIG. 3. These notches are to accommodate the packing box 51.

The cylinders 11 and 13 are inserted through the openings 85 and 87, arranged in alignment with one another in a suitable jig, and welded to the halves 21 and 23. It is of no importance whether the notches 91 and 93 are formed before or after the cylinders 11 and 13 are welded in place, or whether notches 91 and 93 are formed before or after the opening 85 and 87 are formed.

Then, the boat-shaped halves 21 and 23 are welded together in complementary relation by a continuous weld 25. It is here pointed out that it is important that the cylinders 11 and 13 be welded in place prior to joining the halves together, not only because the valve seats 27 are larger than the openings but also because it is necessary to weld the cylinders to the halves at both the interior and exterior surfaces thereof, and it would be impractical if not impossible to perform interior welding operations within the deep chest after the halves were welded together.

Figure 5:
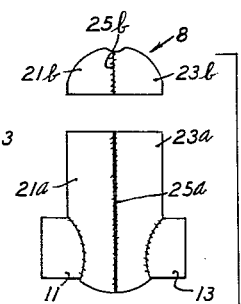

The hollow body provided by welding the halves 21 and 23 together is severed or sawed along a transverse plane with respect to the hollow body adjacent the upper end thereof, as the parts are depicted in FIG. 5, to provide a relatively shallow bonnet 8 composed of complementary halves 21b and 23b, and a deep gate chest provided by complementary halves 21a and 23a. The flanges 15 may be mounted and welded in place at the convenience of the fabricator.

The chest and bonnet flanges 45 and 41 are now fitted, respectively, on the opposed edges of the chest and bonnet and welded in place. The valve seats 27 are now machined to provide a proper fit between the gate and such seats.

The packing box 51 is next mounted in place and welded to the bonnet. Thereafter, the opening in the packing box which is to receive the valve stem 47 may be bored. The remainder of the packing assembly is mounted in place in an obvious order.

Although fabricated valves are not new, the present invention has provided a novel valve construction and a method of making the same which substantially decreases the expense of forming the valve chest and bonnet of a bonnet type valve as compared with the prior art fabricated valves. Only a single die and punch need be provided for forming each of the boat-shaped halves 21 and 23, and after the halves are joined and the resulting structure severed, the shallow bonnet and the deep gate chest are provided. With the method herein disclosed, no deep drawing operations are required. It is pointed out that each boat-shaped section has end portions which are convexly curved throughout and that the end portions of the sections are similarly convexly curved throughout without reversal of curvature. By convexly curved, it is meant that a straight line cannot cut through the outline in more than two points.

Having described the invention in what is considered to be the preferred embodiment thereof, it is desried that it be understood that the invention is not to be limited other than by the provisions of the following claim.

I claim:

A method of fabricating a bonnet type valve of the type having a pair of tubular inlet and outlet members projecting in opposite directions from a valve chest, and wherein a separable bonnet is detachably secured to the upper end of the valve chest, and wherein a tubular packing box projects upwardly from the top of the bonnet, said method including the steps of forming a cupped half shell from a metal blank with the half shell being curved about axes and points all of which are on the concave side of the half shell comprising subjecting the blank to a drawing operation in which a punch having a convex working surface presses the blank into a simple opening of a size smaller than the blank, trimming the edges of the thus formed cup member to form a cupped half shell, similarly forming a second cupped half shell, forming a bonnet and a chest from said half shells with the half shells transversely divided and with the divided half shell portions welded together in pairs, forming in the chest portions inlet and outlet openings of a size slightly larger than the outer diameter of the tubular flow members, welding on one end of each tubular flow member a valve seat of a size larger than either the inlet or outlet opening, prior to welding the chest portions together inserting the tubular flow members through the inlet and outlet openings from the concave sides of the chest portions and with the seat ends of the tubular flow members in trailing relationship, at some time after the tubular flow members are so inserted, welding the tubular flow members to the chest portions and welding flanges to the remote ends of the tubular flow members, at some time after the half shells are made forming mating notches in the bonnet portions to form a hole for a packing box, after the bonnet portions are welded together permanently mounting a tubular packing box in said hole to receive a valve stem.

References Cited in the file of this patent

UNITED STATES PATENTS 2,868,495 Lucas _____ Jan. 13, 1959

FOREIGN PATENTS 522,126 Great Britain _____ June 10, 1940
855,997 Germany _____ Nov. 17, 1952